United States Patent Office 3,531,395
Patented Sept. 29, 1970

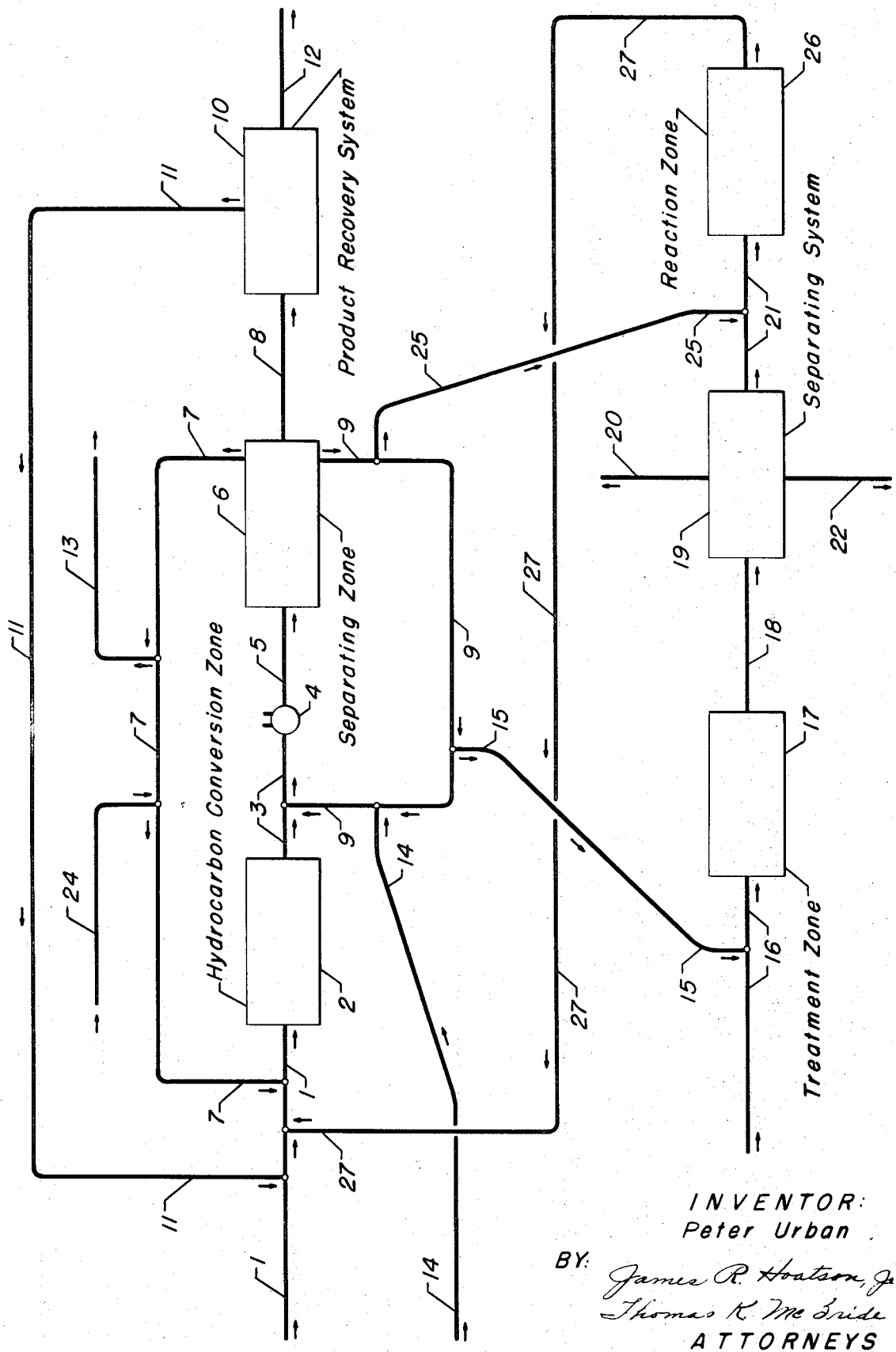

3,531,395
TREATMENT OF AN AQUEOUS WASTE STREAM FROM A HYDROCARBON CONVERSION PLANT WITH CONTINUOUS RECYCLE OF THE TREATED AQUEOUS STREAM
Peter Urban, Northbrook, Ill., assignor to Universal Oil Products Company, Des Plaines, Ill., a corporation of Delaware
Filed Sept. 16, 1968, Ser. No. 760,047
Int. Cl. C10g *13/00*
U.S. Cl. 208—108          15 Claims

ABSTRACT OF THE DISCLOSURE

A hydrocarbon charge stock containing sulfurous and nitrogenous contaminants is converted and elemental sulfur and ammonia is simultaneously recovered by the steps of: (a) contacting in a hydrocarbon conversion zone the hydrocarbon charge stock, hydrogen and an aqueous recycle stream containing ammonium polysulfide with a hydrocarbon conversion catalyst at conversion conditions sufficient to form an effluent stream containing substantially sulfur-free and nitrogen-free hydrocarbons, hydrogen, $NH_3$, $H_2S$, and $H_2O$; (b) cooling and separating the effluent stream from step (a) to form a hydrogen-rich gaseous stream, a hydrocarbon-rich liquid product stream, and an aqueous waste stream containing $NH_4HS$; (c) catalytically treating the aqueous waste stream from step (b) with oxygen at oxidizing conditions effective to produce an effluent stream containing $NH_4OH$, $(NH_4)_2S_2O_3$, and elemental sulfur or ammonium polysulfide; (d) separating sulfur and ammonia from the effluent stream from step (c) to produce an aqueous stream containing $(NH_4)_2S_2O_3$; (e) subjecting the aqueous stream from step (d), and a sulfide-containing stream to reduction conditions effective to form the aqueous recycle stream containing ammonium polysulfide; and (f) passing this last aqueous stream to step (a). Key feature of the resulting process is the continuous recycle of the treated water back to the hydrocarbon conversion process with consequential abatement of water pollution problems and substantial reduction of requirements for make-up water.

---

The subject of the present invention is a combination process directed towards the catalytic conversion of a hydrocarbon charge stock containing sulfurous and nitrogenous contaminants with continuous recovery of at least a portion of the sulfur and ammonia from the product of the hydrocarbon conversion reaction without causing any substantial water pollution problems. More precisely, the present invention relates to processes for the conversion of hydrocarbon charge stocks containing sulfurous and nitrogenous compounds wherein an aqueous waste stream containing substantial quantities of $NH_3$ and $H_2S$ (typically present as $NH_4HS$) is produced and wherein this waste stream is treated to recover elemental sulfur and ammonia and to produce a treated water stream containing ammonium thiosulfate and it is desired to recycle the water contained in this last aqueous stream to the process in order to remove additional quantities of $NH_3$ and $H_2S$, to abate a substantial pollution problem, and to minimize make-up water requirements.

The concept of the present invention developed from my efforts directed towards a solution of a substantial water pollution problem that is caused when a water stream is used to remove ammonium hydrosulfide salts from the effluent equipment train associated with such hydrocarbon conversion processes as hydrorefining, hydrocracking, etc., wherein ammonia and hydrogen sulfide products are produced. The original purpose for injecting the water stream into the effluent train of heat transfer equipment associated with these processes was to remove these detrimental salts which could clog-up the equipment. The waste water stream so-formed presented a substantial pollution hazard insofar as it contains sulfide salts which have a substantial biological oxygen demand and ammonia which is a nutrient that leads to excessive growth of stream vegetation. One solution commonly used in the prior art to control this pollution problem is to strip $NH_3$ and $H_2S$ from this waste water stream with resulting recycle of the stripped water to the effluent equipment. Another solution is to sufficiently dilute the waste water stream so that the concentration of sulfide salts is reduced to a level wherein it is relatively innocuous and to discharge the diluted stream into a suitable sewer. My approach to the solution to this problem has been directed towards a waste water treatment process which would allow recovery of the commercially valuable elemental sulfur and ammonia directly from this waste water solution by a controlled oxidation method. However, despite careful and exhaustive investigations of alternative methods for direct oxidation of the sulfide salts contained in this waste water stream, it has been determined that an inevitable side product of the oxidation step appears to be ammonium thiosulfate. The presence of ammonium thiosulfate in the treated aqueous stream presents a substantial problem because for efficient control of the water pollution problem and in order to have a minimum requirement for make-up water, it is desired to operate the waste water treating plant with a closed water loop. That is, it is desired to continuously recycle the treated water stream back to the process in order to remove additional quantities of the detrimental sulfide salts.

The presence of ammonium thiosulfate in this treated aqueous stream prevents the direct recycling of this stream back to the effluent equipment associated with this process primarily because the ammonium thiosulfate reacts with hydrogen sulfide contained in the effluent stream from the process to produce elemental sulfur, with resulting contamination of the hydrocarbon product stream with free sulfur which causes severe corrosion problems in the downstream equipment. In addition, ammonium thiosulfate is non-volatile and will contribute to salt formation in the effluent equipment. I have now found a convenient and simple procedure for removing the ammonium thiosulfate from this treated aqueous stream without contaminating the oil stream with free sulfur, and my method essentially involves: subjecting the treated aqueous stream containing ammonium thiosulfate to a reduction with sulfide to produce an effluent stream containing a minor amount of ammonium polysulfide; and passing this last stream to the hydrocarbon conversion zone wherein the ammonium polysulfide is catalytically reacted with hydrogen to yield $NH_3$ and $H_2S$. In other words, I have found that the problem caused by the presence of ammonium thiosulfate in the aqueous effluent stream from the oxidation step of the waste water treatment process, is effectively and efficiently solved by first subjecting this stream to a reduction step with $H_2S$ or ammonium sulfide to produce an aqueous stream containing ammonium polysulfide, and then passing this last stream to the hydrocarbon conversion zone wherein the ammonium polysulfide is catalytically reduced with hydrogen to $H_2S$. The principal advantage derived from the preliminary reduction with sulfide is a substantial saving of valuable hydrogen in comparison with the amount of hydrogen required when the thiosulfate-containing effluent stream is charged directly to the hydrocarbon conversion zone.

It is, accordingly, an object of the present invention to provide a combination process for converting a hydrocarbon charge stock containing sulfurous and nitrogenous contaminants and for simultaneously recovering sulfur and ammonia. A second object is to eliminate one source of waste water streams that cause water pollution problems in the vicinity of petroleum refineries. A third object is to substantially reduce the requirements for fresh water or make-up water for the operation of a hydrocarbon conversion process wherein hydrogen sulfide and ammonia are produced as side products. Another object is to provide a combination process wherein a waste water stream containing ammonium hydrosulfide is produced, wherein this waste water stream is treated to recover sulfur and ammonia to produce a treated aqueous stream and the treated aqueous stream is recycled to the process to remove additional quantities of ammonia and hydrogen sulfide; that is, to provide a process of this type that is run in closed loop fashion with regard to the water stream utilized. Still another object is to minimize the requirement for hydrogen necessary to reduce ammonium thiosulfate contained in a recycle water stream that is to be recycled to a hydrocarbon conversion zone in a combination process of the type described herein.

In one embodiment, the present invention is a combination process for converting a hydrocarbon charge stock containing sulfurous and nitrogenous contaminants and for recovering elemental sulfur and ammonia where the requirements for make-up water and hydrogen are minimized. The first step of this process involves contacting, in a hydrocarbon conversion zone, the hydrocarbon charge stock, hydrogen and an aqueous recycle stream containing ammonium polysulfide with a hydrocarbon conversion catalyst at conversion conditions sufficient to form an effluent stream containing substantially sulfur-free and nitrogen-free hydrocrabons, hydrogen, $NH_3$, $H_2S$, and $H_2O$. The second step involves cooling and separating the effluent stream from the first step to form a hydrogen-rich gaseous stream, a hydrocarbon-rich liquid product stream, and an aqueous waste stream containing $NH_4HS$. The third step involves catalytically treating the aqueous waste stream from the second step with oxygen at oxidizing conditions effective to produce an effluent stream containing $NH_4OH$, $(NH_4)_2S_2O_3$, and elemental sulfur or ammonium polysulfide. The fourth step comprises separating sulfur and ammonia from the effluent stream from the third step to produce an aqueous stream containing $(NH_4)_2S_2O_3$. In the fifth step the aqueous stream containing $(NH_4)_2S_2O_3$ from the fourth step and a sulfide-containing stream are subjected to reduction conditions effective to form an aqueous recycle stream containing ammonium polysulfide. And, the final step is recycling this last stream to the first step.

In a second embodiment, the process of the present invention encompasses a process as outlined in the first embodiment wherein the hydrocarbon conversion catalyst utilized in the first step comprises a metallic component selected from the metals and compounds of the metals of Group VI(b) and Group VIII combined with a refractory inorganic oxide carrier material.

In a third embodiment, the present invention is the process described above in the first embodiment wherein a water-immiscible sulfur solvent is also charged to the third step and wherein the fourth step comprises: separating the effluent stream from the third step into a sulfur solvent phase containing the sulfur formed in said third step and an aqueous phase containing $NH_4OH$ and $(NH_4)_2S_2O_3$ and stripping at least a portion of the ammonia from this aqueous phase to produce an aqueous stream containing $(NH_4)_2S_2O_3$.

In another embodiment, the process of the present invention comprises the process first outlined above wherein the treating step is operated with less than 0.5 mole of oxygen per mole of $NH_4HS$ in the waste stream to produce an aqueous effluent stream containing ammonium polysulfide, $NH_4OH$ and $(NH_4)_2S_2O_3$, and wherein the fourth step comprises: subjecting the aqueous effluent stream from the third step to ammonium polysulfide decomposition conditions to produce a vapor stream containing $NH_3$, $H_2S$, and $H_2O$, and an aqueous stream containing elemental sulfur and $(NH_4)_2S_2O_3$; and separating sulfur from this last aqueous stream to produce an aqueous stream containing $(NH_4)_2S_2O_3$.

In a preferred embodiment, the present invention is a process for converting a hydrocarbon charge stock containing sulfurous and nitrogenous contaminants and for recovery of elemental sulfur and ammonia where the requirement for make-up water and hydrogen are minimized. The first step of this process involves contacting, in a hydrocarbon conversion zone, the hydrocarbon charge stock, hydrogen and an aqueous recycle stream containing ammonium polysulfide with a hydrocarbon conversion catalyst comprising a metallic component selected from the metals and compounds of the metals of Group VI(b) and Group VIII combined with a refractory inorganic oxide material at conversion conditions sufficient to form an effluent stream containing substantially sulfur-free and nitrogen-free hydrocarbons, hydrogen, $NH_3$, $H_2S$, and $H_2O$. The second step involves cooling and separating the effluent stream from the first step to form a hydrogen-rich gaseous stream, a hydrocarbon-rich liquid product stream, and an aqueous waste stream containing $NH_4HS$. The third step comprises contacting the aqueous waste stream from the second step, and oxygen with a phthalocyanine catalyst at oxidizing conditions, including a temperature less than 200° F., effective to produce an effluent stream containing ammonium polysulfide, $NH_4OH$, and $(NH_4)_2S_2O_3$. In the fourth step, the effluent from the third step is subjected to polysulfide decomposition conditions sufficient to produce a vapor stream containing $NH_3$, $H_2S$, and $H_2O$ and an aqueous stream containing elemental sulfur and $(NH_4)_2S_2O_3$. The fifth step is separating sulfur from the aqueous stream from the fourth step to produce the aqueous stream containing $(NH_4)_2S_2O_3$. The sixth step involves subjecting the aqueous stream containing $(NH_4)_2S_2O_3$ and a sulfide-containing stream to reduction conditions effective to form an aqueous recycle stream containing ammonium polysulfide. And, the final step is passing the aqueous recycle stream to the first step.

Other objects and embodiments are hereinafter disclosed in the following discussion of the input streams, the output streams and the mechanics associated with each of the essential steps of the present invention.

As indicated above, the first step of the present invention involves the catalytic conversion of a hydrocarbon charge stock containing sulfurous and nitrogenous contaminants. The scope of this step is intended to embrace all catalytic petroleum processes which utilize hydrogen in the presence of a hydrocarbon conversion catalyst to react with sulfur and nitrogen compounds contained in the charge stock to produce, inter alia, $H_2S$, and $NH_3$. Generally, in these processes, the hydrocarbon charge stock containing the sulfurous and nitrogenous contaminants and hydrogen are passed into contact with a hydrocarbon conversion catalyst comprising a metallic component selected from the metals and compounds of the metals of Group VI(b) and Group VIII combined with a refractory inorganic oxide carrier material at conversion conditions, including an elevated temperature and superatmospheric pressure, sufficient to produce an effluent stream containing substantially sulfur-free and nitrogen-free hydrocarbons, hydrogen, $H_2S$ and $NH_3$. One example of a preferred conversion process, included within the scope of this first step, is the process known in the art as hydrorefining, or hydrodesulfurization. The principal purpose of a hydrorefining process is to desulfurize a hydrocarbon charge stock charged thereto by mild treatment with hydrogen which generally is selected enough to saturate olefinic-type hydrocarbons and to rupture carbon-nitrogen and carbon sulfur bonds but is not severe enough to saturate aromatics. The charge to the hydrorefining process is typically a charge stock boiling in the range of about 100° F. to about 650° F., such as a gasoline boiling range charge stock or a kerosene boiling range charge stock or a heavy naphtha, which charge stock contains minor amounts of sulfurous and nitrogenous contaminants which are to be removed without causing any substantial amount of cracking or hydrocracking. The hydrorefining catalyst utilized is preferably disposed as a fixed bed in the conversion zone and typically comprises a metallic component selected from the transition metals and compounds of the transition metals of the Periodic Table. In particular, a preferred hydrorefining catalyst comprises an oxide or sulfide of a Group VIII metal, especially an iron group metal, mixed with an oxide or sulfide of a Group VI(b) metal, especially molybdenum or tungsten. These metallic components are preferably combined with a carrier material which generally is characterized as a refractory inorganic oxide such as alumina, silica, zirconia, titania, etc. Mixtures of these refractory inorganic oxides are generally also utilized, especially mixtures of alumina and silica. Moreover, the carrier materials may be synthetically prepared or naturally occurring materials such as clays, bauxite, etc. Preferably, the carrier material is not made highly acidic. A preferred hydrorefining catalyst comprises cobalt oxide or sulfur and molybdenum oxide or sulfide combined with an alumina carrier material containing a minor amount of silica. Suitable conditions utilized in this first step in the hydrorefining mode are: a temperature in the range of about 700 to about 900° F., a pressure of about 100 to about 3000 p.s.i.g., a liquid hourly space velocity of about 1 to about 20 hr.$^{-1}$ and a hydrogen to oil ratio of about 500:1 to about 10,000:1 standard cubic feet of hydrogen per barrel of charge stock.

Another example of the type of conversion process which is preferably utilized as the first step of the present invention is a hydrocracking process. The principal objective of this type of process is not only to effect hydrogenation of the charge stock but also to effect selective cracking or hydrocracking. In general, the hydrocarbon charge stock, when the first step is hydrocracking, is a stock boiling above the gasoline range such as straight-run gas oil fractions, lubricating oil, coker gas oils, cycle oils, slurry oils, heavy recycle stocks, crude petroleum oils, reduced and/or topped crude oils, etc. Furthermore, these hydrocarbon charge stocks contain minor amounts of sulfurous and nitrogenous contaminants which may range from about 100 p.p.m. sulfur to 3 or 4 wt. percent sulfur or more; typically, the nitrogen concentration in this charge stock will be substantially less than the sulfur concentration except for some rare charge stocks, such as those derived from some types of shale oil, which contain more nitrogen than sulfur. The hydrocracking catalyst utilized typically comprises a metallic component selected from the metals and compounds of metals of Group VI(b) and Group VIII combined with a refractory inorganic oxide. Particularly preferred metallic components comprise the oxides or sulfides of molybdenum and tungsten from Group VI(b) and iron, cobalt, nickel, platinum and palladium from Group VIII. The preferred refractory inorganic oxide carrier material is a composite of alumina and silica, although any of the refractory inorganic oxides mentioned hereinbefore may be utilized as a carrier material if desired. Since it is desired that the catalyst possess a cracking function, the acid activity of these carrier materials may be further enhanced by the incorporation of small amounts of acidic materials such as fluorine and/or chlorine. In addition, in some cases it is advantageous to include within the carrier material a crystalline aluminosilicate either in the hydrogen form or in a rare earth exchanged form. Preferred aluminosilicates are the Type X and Type Y forms of faujasite, although any other suitable aluminosilicate either naturally occurring or synthetically prepared may be utilized if desired. Conditions utilized in the first step which is operated in the hydrocracking mode include: a temperature of about 500 to about 1000° F., a pressure in the range of about 300 to about 5000 p.s.i.g., a liquid hourly space velocity of about 0.5 to about 15.0 hr.$^{-1}$ and a hydrogen to oil ratio of about 1000:1 to about 20,000:1 standard cubic feet of hydrogen per barrel of oil.

Regardless of the details concerning the exact type of process utilized in the first step, the effluent stream recovered therefrom contains substantially sulfur-free and nitrogen-free hydrocarbons, hydrogen, $NH_3$, $H_2S$ and $H_2O$. At least some of the water contained in this effluent stream may be produced by the reduction of oxygen-containing compounds contained in the hydrocarbon charge stock; however, it is an essential feature of the present invention that the major portion of the water contained in this effluent stream is the result of a recycle aqueous stream being charged to the first step as will be explained hereinbelow. In the second step of the present invention, this effluent stream is cooled, in any suitable cooling means, and then separated, in any suitable separating means, into a hydrogen-rich gaseous stream, a hydrocarbon-rich liquid product stream, and a waste water stream containing $NH_4HS$. As discussed previously, the uniform practice of the prior art has been to inject sufficient water into the effluent stream from the first step upstream of the heat exchange equipment in order to wash out ammonium sulfide salts that would be otherwise produced when the effluent is cooled to temperatures below about 200° F. As indicated hereinbefore, an essential feature of the present invention is that the source of a major portion of the water necessary to wash out these ammonium sulfide salts is a recycle aqueous stream which is charged to the first step. During start-up of the process of the present invention, and during the course of the process, additional make-up water may be added to the effluent stream from the first step, if desired, on the influent side of the heat exchange equipment. The total amount of water utilized is obviously a pronounced function of the amount of $NH_3$ and $H_2S$ in this effluent stream; typically it is about 1 to about 20 or more gallons of water per 100 gallons of oil charged to the hydrocarbon conversion step. Irrespective of how the water gets into the effluent stream, the resulting cooled effluent stream is typically passed to a separating zone wherein it separates into a hydrogen-rich gaseous phase, a hydrocarbon-rich liquid phase and a waste water phase. The hydrogen-rich gaseous phase is then withdrawn from this zone, and a portion of it typically recycled to the hydrocarbon conversion zone through suitable compressive means. The hydrocarbon-rich liquid product phase is typically withdrawn and passed to a suitable product recovery system which generally, for the type of hydrocarbon conversion processes within the scope of the present invention, comprises a suitable train of fractionating equipment designed to separate this hydrocarbon-rich product stream into a series of desired products, some of which may be recycled. The aqueous phase formed in the separating zone is typically withdrawn to form an aqueous waste stream containing ammonium hydrosulfide ($NH_4HS$). This stream may, in some cases, contain excess amounts of $NH_3$ relative to the amounts of $H_2S$ adsorbed therein, but very rarely will contain more $H_2S$ and $NH_3$ because of the relatively low solubility of $H_2S$ in an aqueous solution containing a ratio of dissolved $H_2S$ to dissolved $NH_3$ greater than about 1:1.

The amount of $NH_4HS$ contained in this aqueous waste stream may vary over a wide range up to the solubility limit of the sulfide salt in water. Typically, the amount of $NH_4HS$ is about 1.0 to about 10.0 wt. percent of the waste stream. For example, a typical waste water stream from a hydrocracking plant contains 3.7 wt. percent $NH_4HS$.

Following this separation step, the aqueous waste stream produced therein is passed to a treating step wherein it is catalytically treated with oxygen at oxidizing conditions selected to produce an aqueous effluent stream containing NH$_4$OH, (NH$_4$)$_2$S$_2$O$_3$, and elemental sulfur or ammonium polysulfide. In some cases, it is advantageous to remove dissolved or entrained oil contained in this waste stream by a suitable scrubbing operation prior to passing it to the treatment step; however, in most cases this waste stream is charged directly to the treating step.

The catalyst utilized in the treating step is a suitable solid oxidizing catalyst that is capable of effecting substantially complete conversion of the ammonium hydrosulfide salt contained in this waste stream. Two particularly preferred classes of catalyst for this step are metallic sulfides, particularly iron group metallic sulfides, and metal phthalocyanines. The metallic sulfide catalyst is selected from the group consisting of sulfides of nickel, cobalt, and iron, with nickel being especially preferred. Although it is possible to perform this step with a slurry of the metallic sulfide, it is preferred that the metallic sulfide be composited with a suitable carrier material. Examples of suitable carrier materials are: charcoal, such as wood charcoal, bone charcoal, etc. which may or may not be activated prior to use; and refractory inorganic oxides such as alumina, silica, zirconia, kieselguhr, bauxite, etc. and other natural or synthetic highly porous inorganic carrier materials. The preferred carrier materials are alumina and activated charcoal and thus a preferred catalyst is nickel sulfide combined with alumina or activated charcoal.

Another preferred catalyst for use in this treatment step is a metal phthalocyanine catalyst combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine may be employed including the sulfonated derivatives and the carboxylated derivatives. Any of the carrier materials previously mentioned in connection with the metallic sulfide catalyst can be utilized with the phthalocyanine catalyst; however, the preferred carrier material is activated carbon. Hence, a particularly preferred catalyst for use in the treatment step comprises a cobalt or vanadium phthalocyanine sulfonate combined with an activated carbon carrier material. Additional details as to alternative carrier materials, methods of preparation, and the preferred amounts of catalytic components are given in the teachings of U.S. Pat. No. 3,108,081 for these phthalocyanine catalysts.

Although this treatment step can be performed according to any of the methods taught in the art for contacting a liquid stream with a solid catalyst such as a fluidized catalyst system or a moving bed system, the preferred system involves a fixed bed of the solid oxidizing catalyst disposed in a treatment zone. The aqueous waste stream is then passed therethrough in either upward, radial, or downward flow and the oxygen stream is passed thereto in either concurrent or countercurrent flow relative to the aqueous waste stream. Because one of the products of this treatment step is elemental sulfur, there is a substantial catalyst contamination problem caused by the deposition of this elemental sulfur on the fixed bed of the catalyst. In general, in order to avoid sulfur deposition on the catalyst, it is preferred to operate this step in either of two alternative modes. In the first mode, a sulfur solvent is admixed with the waste stream and charged to the treatment zone in order to effect removal of deposited sulfur from the solid catalyst. Any suitable sulfur solvent may be utilized provided that it is substantially inert to the conditions utilized in the treatment zone and that it dissolves substantial quantities of sulfur. Examples of suitable sulfur solvents are: disulfide compounds such as carbon disulfide, methyldisulfide, ethyldisulfide, etc.; aromatic compounds such as benzene, toluene, xylene, ethylbenzene, etc.; aliphatic paraffins such as pentane, hexane, heptane, etc.; cyclic paraffins such as methylcyclopentane, cyclopentanes, cyclohexane, etc.; halide compounds such as carbon tetrachloride, methylene chloride, ethylene chloride, chloroform, tetrachloroethane, butyl chloride, propyl bromide, ethyldibromide, chlorobenzene, dichlorobenzene, etc.; and the like solvents. Moreover, mixtures of these solvents may be utilized if desired, and in particular a solvent which is particularly effective is an aromatic-rich reformate. In this mode, the preferred operation encompasses the utilization of a sulfur solvent that is substantially immiscible with the aqueous waste stream. Furthermore, the solubility of sulfur in the solvent is preferably such that it is markedly greater at a temperature in the range of about 175° F. to about 400° F. than it is in temperatures in the range of about 32° F. to about 170° F. This last preference facilitates removal of sulfur through crystallization if such is desired. Considering all of these requirements, the preferred sulfur solvent is selected from the group consisting of benzene, toluene, xylene, and mixture thereof. Another group of preferred sulfer solvents are the halogenated hydrocarbons.

The amount of sulfur solvent utilized in this treatment step is a function of the net sulfur production for the particular waste stream, the activity and selectivity characteristics of the catalyst selected, and the solubility characteristics of the sulfur solvent. In general, the volumetric ratio of sulfur solvent to aqueous waste stream is selected such that there is at least enough sulfur solvent to carry away the net sulfur production from the oxidation reaction. As a practical matter, it is convenient to operate at a volumetric ratio substantially in excess of the minimum amount required to strip the sulfur from the catalyst; for example, for aqueous waste streams containing about 3 wt. percent ammonium hydrosulfide, a volumetric ratio of about 1 volume of sulfur solvent per volume of waste stream gives excellent results. The exact selection of the volumetric ratio for the particular waste stream and catalyst utilized can be made by a suitable experiment or series of experiments, the details of which would be self-evident to one skilled in the art.

Accordingly, in the first mode of operation of the treatment step, a sulfur solvent and oxygen are charged in admixture with the aqueous waste stream to the treatment zone to produce an effluent stream comprising the sulfur solvent containing dissolved sulfur formed by the oxidation reaction, and water containing NH$_4$OH, $$(NH_4)_2S_2O_3$$

and, possibly, a minor amount of other oxides of sulfur. This effluent stream is passed to a separating zone where, in the preferred operation in which an immiscible sulfur solvent is utilized, a sulfur solvent phase separating from a treated aqueous phase containing NH$_4$OH and $$(NH_4)_2S_2O_3$$

At least a portion of the sulfur solvent phase is then withdrawn from the separating zone and passed to a suitable sulfur recovery zone wherein at least a portion of the dissolved sulfur is removed therefrom by any of the methods known in the art such as crystallization, distillation, etc. A preferred procedure is to distill off sulfur solvent and recover a slurry of molten sulfur from the bottoms of the sulfur recovery zone. The recovered sulfur solvent can then be recycled to the treatment step. It is, of course, understood that it is not necessary to treat all of the sulfur solvent to remove sulfur therefrom; that is, it is only necessary to treat an amount of the rich sulfur solvent sufficient to recover the net sulfur production. In any event, an aqueous phase containing NH$_4$OH and (NH$_4$)$_2$S$_2$O$_3$ is withdrawn from this separating zone, and passed to a stripping zone wherein at least a portion of the ammonia contained therein is removed to produce an aqueous stream containing (NH$_4$)$_2$S$_2$O$_3$. In accordance with the present invention, this last stream is treated with sulfide at reduction conditions and the resulting ammonium polysulfide-containing stream charged to the hydrocarbon conversion step in order to reduce the ammonium polysulfide contained therein to hydrogen sulfide, water and ammonia.

The second mode of operation of the treatment step comprises carefully regulating the stoichiometric amount of oxygen injected into the treatment zone so that oxygen is provided in an amount less than the stoichiometric amount required to oxidize all of the ammonium hydrosulfide in the aqueous waste stream to elemental sulfur. Hence, for this mode, it is required that oxygen be present in a mole ratio less than 0.50 mole of $O_2$ per mole of $NH_4HS$ and preferably about 0.25 to about 0.45 mole of oxygen per mole of ammonium hydrosulfide in the aqueous waste stream. The exact value within this range is selected such that sufficient sulfide remains available to react with the net sulfur production—that is to say, this mode of operation requires that sufficient excess sulfide be available to form polysulfide with the elemental sulfur which is the product of the primary oxidation reaction. Since one mole of sulfide will react with many moles of sulfur (i.e. about 5 moles of sulfur per mole of sulfide), it is generally only necessary that a small amount of sulfide remain unoxidized.

In this second mode, an aqueous effluent stream containing ammonium polysulfide $(NH_4)_2S_2O_3$, $NH_4OH$ and a minor amount of other oxides of sulfur is withdrawn from the treatment step and passed to a polysulfide decomposition zone wherein the polysulfide compound is decomposed to yield a vapor stream containing $NH_3$, $H_2S$ and $H_2O$ and an aqueous stream containing elemental sulfur and $(NH_4)_2S_2O_3$. The preferred method for decomposing the polysulfide solution involves subjecting it to conditions, including a temperature in the range of about 100° F. to about 350° F. sufficient to form an overhead stream comprising $NH_3$, $H_2S$ and $H_2O$ and a bottom stream comprising elemental sulfur in admixture with an aqueous stream containing $(NH_4)_2S_2O_3$. In most cases, it is advantageous to accelerate the polysulfide decomposition reaction by stripping $H_2S$ from the polysulfide solution with the aid of a suitable inert gas such as steam, air, flue gas, etc., which can be injected into the bottom of the decomposition zone. When the bottom stream contains a slurry of sulfur, it is then subjected to any of the techniques taught in the art for removing a solid from a liquid such as filtration, settling, centrifuging, etc. to remove the elemental sulfur therefrom. In some cases, this bottom stream will contain molten sulfur which can be separated by a suitable settling step. After separation of sulfur from the bottom stream, the resulting aqueous stream contains a minor amount of $$(NH_4)_2S_2O_3$$

and in accordance with the present invention is treated with sulfide before being recycled to the hydrocarbon conversion step. In the case where the bottom temperature of the decomposition zone is maintained above 250° F., the separation of elemental sulfur from the aqueous recycle stream can be performed, if desired, within the decomposition zone by allowing a liquid sulfur phase to form at the bottom of this zone, and separately drawing off the aqueous stream and a liquid sulfur stream.

An essential reactant for both modes of the treatment step is oxygen. This may be present in any suitable form either by itself or mixed with other inert gases. In general, it is preferred to utilize air to supply the necessary oxygen. As indicated hereinbefore, in the second mode the amount of oxygen utilized is less than the stoichiometric amount required to oxidize all of the ammonium hydrosulfide to elemental sulfur, and in the first mode of operation, where a sulfur solvent is utilized, the amount of oxygen is ordinarily chosen to be greater than the stoichiometric amount necessary to oxidize all sulfide to sulfur; that is, oxygen is generally utilized in the first mode in a mole ratio of about 0.5:1 to about 1.5:1 or more, moles of oxygen per mole of ammonium hydrosulfide contained in the aqueous waste stream.

Regarding the conditions utilized in the treatment step of the present invention, it is preferred for both modes of operation to utilize a temperature in the range of about 30° F. up to about 400° F. with a temperature of about 80° F. to about 220° F. yielding best results. In fact, it is especially preferred to operate with a temperature less than 200° F., since this minimizes sulfate formation. The sulfide oxidation reaction is not too sensitive to pressure and, accordingly, any pressure which maintains the waste stream in the liquid phase may be utilized. In general, it is preferred to operate at superatmospheric pressure in order to facilitate contact between the oxygen and the waste stream, and pressures of about 25 p.s.i.g. to about 75 p.s.i.g. is particularly preferred. Additionally, the liquid hourly space velocity (defined to be the volume rate per hour of charging the aqueous waste stream divided by the total volume of the treatment zone containing catalyst) is preferably selected from the range of about 0.5 to about 10.0 hr.$^{-1}$.

Regardless of which mode of operation is utilized in the treatment step, an aqueous stream containing $$(NH_4)_2S_2O_3$$

is ultimately recovered therefrom. In accordance with the present invention, this stream is subjected to a reduction step with a sulfide-containing stream, which typically is a gas stream containing $H_2S$ or a liquid stream containing $(NH_4)_2S$ or $NH_4HS$, and the resulting effluent stream from the reduction step is passed to the hydrocarbon conversion step. Any suitable sulfide-containing stream can be utilized in this reduction step; however, it is preferred to derive this stream from one or more of the following sources. One source is a drag stream from the aqueous waste stream withdrawn from the high pressure separating zone utilized in the hydrocarbon conversion process. A second source is the overhead stream containing $NH_3$, $H_2S$, and $H_2O$ which is recovered from the polysulfide decomposition zone when the treatment step is operated in the polysulfide mode. Another source of a suitable sulfide-containing stream is a portion of the $H_2S$-rich flash gas typically produced when the hydrocarbon-rich liquid product stream recovered from the effluent from the hydrocarbon conversion step is passed to a low pressure separating zone wherein a $H_2S$-rich gas is flashed off typically at a pressure of about 75 p.s.i.g. and a temperature of about 100° F.

Irrespective of the source of the sulfide-containing stream, it is necessary to provide sufficient sulfide to reduce the thiosulfate to elemental sulfur and to react with the resulting sulfur to produce a polysulfide. I have found good results when the mole ratio of sulfide to thiosulfate is selected from the range of about 2:1 to about 10:1 or more, with a value of about 2:1 to about 4:1 being preferred.

This reduction step is conducted at the following conditions: a temperature of about 200° F. to about 700° F., and preferably about 325° F. to about 400° F.; a pressure which is generally sufficient to maintain a part of the water in the liquid phase, and preferably a pressure of about 100 to 5000 p.s.i.g.; and a contact time of about 0.01 to about 2 hours, and preferably about 0.05 to about 0.2 hour. It is to be noted that the reduction step does not require a catalyst. Moreover, the input streams may be passed to this step in either countercurrent or concurrent flow with the latter being preferred.

An aqueous effluent stream containing ammonium polysulfide is withdrawn from this reduction step; and, in accordance with the present invention, is charged to the hydrocarbon conversion step in order to reduce the polysulfide to $H_2S$, to provide the recycle water needed for keeping the effluent condensor free of sulfide salts, and to avoid contamination of the hydrocarbon product stream with elemental sulfur.

Having broadly characterized the essential steps comprising the process of the present invention, reference is now had to the attached drawing for a detailed explanation of an example of a preferred flow scheme employed in the present invention. The attached drawing is merely intended as a general representation of the flow scheme employed with no intent to give details about heaters, condensors, pumps, compressors, valves, process control equipment, etc. except where a knowledge of these devices is essential to an understanding of the present invention or would not be self-evident to one skilled in the art. In addition, in order to provide a working example of a preferred mode of the present invention, the attached drawing is discussed with reference to a particularly preferred mode of operation of each of the steps of the present invention and preferred catalyst for use in these steps. Moreover, it is to be understood that the description given in conjunction with a discussion of the attached drawing refers to a combination process that has been started up and is producing an aqueous recycle stream containing ammonium polysulfide which is being recycled to the hydrocarbon conversion step.

Referring now to the attached drawing, a light gas oil is commingled with a cycle stock at the junction of line 11 and line 1, with an aqueous recycle stream containing ammonium polysulfide at the junction of line 27 with line 1, and with a recycle hydrogen stream at the junction of line 7 with line 1. The resulting mixture is then heated via a suitable heating means (not shown) to the desired conversion temperature and then passed into hydrocarbon conversion zone 2. An analysis of the light gas oil shows it to have the following properties; an °API gravity at 60° F. of 25, an initial boiling point of 421° F., a 50% boiling point of 518° F., and an end boiling point of 663° F., a sulfur content of 2.21 wt. percent, and a nitrogen content of 126 wt. p.p.m. Hydrogen is supplied via line 7 at a rate corresponding to a hydrogen recycle ratio of 10,000 standard cubic feet of hydrogen per barrel of oil charged to hydrocarbon conversion zone 2. The cycle stock which is being recycled via line 11 is a portion of the 400+ fraction of the product stream which is separated in product recovery system 10 as will be hereinafter explained. The catalyst utilized in zone 2 comprises nickel sulfide combined with a carrier material containing silica and alumina in a weight ratio of about 3 parts silica per part of alumina. The nickel sulfide is present in amounts sufficient to provide about 5.0 wt. percent nickel in the final catalyst. The catalyst is maintained within zone 2 as a fixed bed of ⅛ inch by ⅛ inch cylindrical pills. The conditions utilized in zone 2 are hydrocracking conditions which include a pressure of about 1500 p.s.i.g., a conversion temperature of about 600° F., and a liquid hourly space velocity of about 2.0 hr.$^{-1}$ based on combined feed. An effluent stream is then withdrawn from zone 2, via line 3 commingled with a water stream at the junction of line 9 with line 3 and passed into cooling means 4 wherein the mixture is cooled to a temperature of about 100° F. The cooled mixture is then passed via line 5 into separating zone 6 which is maintained at a temperature of about 100° F. and a pressure of about 1450 p.s.i.g. The amount of water injected into line 3 via line 9 plus the amount added via line 27 to the influent to zone 2 is about 5 gallons of water per 100 gallons of oil. As explained hereinbefore, the reason for adding the water on the influent side of condenser 4 is to insure that this condenser does not become clogged with sulfide salts.

In separating zone 6, a three-phase system is formed. The gaseous phase comprises hydrogen, hydrogen sulfide and a minor amount of light ends. The oil phase contains a relatively large amount of dissolved $H_2S$. The water phase contains about 5 wt. percent ammonium hydrosulfide with a slight molar excess of ammonia. The hydrogen-rich gaseous phase is withdrawn via line 7 and a portion of it (about 20 vol. percent) is vented from the system via line 13 in order to prevent build-up of excessive amounts of $H_2S$ in this stream. The remainder of the hydrogen stream is passed via line 7 through compressive means, not shown, and is commingled with additional make-up hydrogen entering the process via line 24 and passed back to hydrocarbon conversion zone 2. The oil phase from separating zone 6 is withdrawn via line 8 and passed to product recovery system 10.

In this case, product recovery system 10 comprises a low pressure separating zone and a suitable train of fractionating means. In the low pressure separating zone, the product stream is maintained at a pressure of about 100 p.s.i.g. and a temperature of about 100° F. in order to flash off dissolved $H_2S$ from this oil stream. The resulting stripped oil stream is fractionated to recover a gasoline boiling range product stream and a cycle oil comprising the portion of the product stream boiling above 400° F. The gasoline product stream is recovered via line 12 and the cycle oil is recycled to hydrocarbon conversion zone 2 via line 11.

Returning to the aqueous phase formed in separating zone 6, it is withdrawn via line 9 and continuously recycled back to line 3. Additional make-up water is injected through line 14 during start-up of the process and to make up for losses during the course of the process. It is a feature of the present invention that the requirement for make-up water is minimized. Two drag streams are withdrawn from the water stream flowing through line 9, the first at the junction of line 25 with line 9, and the second at the junction of line 9 with line 15. This second drag stream is passed via line 15 to line 16 where it is commingled with an air stream and, the resulting mixture is passed into treatment zone 17.

Treatment zone 17 contains a fixed bed of a solid catalyst comprising cobalt phthalocyanine mono-sulfonate combined with an activated carbon carrier material in an amount such that the catalyst contains 0.5 wt. percent phthalocyanine catalyst. The activated carbon granules used as the carrier material are in a size of 30–40 mesh. Ammonium hydrosulfide is present in the aqueous stream in an amount of about 5 wt. percent and this stream is charged to treatment zone 17 at a liquid hourly space velocity of about 1.0 hr.$^{-1}$. The amount of air which is also charged to treatment zone 17 via line 16 is about 0.7 atom of oxygen per atom of sulfide contained in the waste water stream. As previously explained, this is an amount less than the stoichiometric amount necessary to convert the sulfide to sulfur, and consequently ammonium polysulfide is formed with treatment zone 17. The conditions utilized in this zone are a temperature of 95° F. and a pressure of 50 p.s.i.g. Because of side reactions, a minor amount of the sulfide contained in the aqueous waste stream is oxidized to higher oxides of sulfur, principally $(NH_4)_2S_2O_3$. Depending somewhat upon the life of the catalyst utilized within zone 17, about 1 to about 10% or more of the sulfide will be oxidized to $(NH_4)_2S_2O_3$. Accordingly, the effluent stream withdrawn from zone 17 via line 18 contains ammonium polysulfide, $NH_4OH$, $(NH_4)_2S_2O_3$, and a minor amount of nitrogen gas. This stream is passed to separating system 19 which in this case comprises: a gas separator, a polysulfide decomposition zone and a sulfur recovery zone. In the gas separator, the minor amount of nitrogen gas contained in the effluent stream from treatment zone 17 is vented from the system. In the polysulfide decomposition zone, the liquid effluent stream from the gas separator is heated to a temperature of about 210° F. and passed into a distillation column wherein an overhead stream containing $NH_3$, $H_2O$, and a minor amount of $H_2S$ is recovered via line 20 and a bottom stream containing a slurry of elemental sulfur in an aqueous solution of $(NH_4)_2S_2O_3$ is withdrawn as a bottom stream. This bottom stream is passed to a sulfur recovery zone wherein the elemental sulfur is filtered from this stream and recovered via line 22. The resulting elemental sulfur-free aqueous stream containing a minor amount of $(NH_4)_2S_2O_3$ is withdrawn from separating system 19 via line 21 and commingled with the first drag stream, which was withdrawn from the aqueous waste stream from separating zone 6, at the junction of line 21 with line 25. As previously mentioned, $NH_4HS$ is present in the aqueous waste stream flowing through line 25 in an amount of about 5 wt. percent, and a sufficient amount of this stream is commingled with the stream flowing through line 21 to provide a mixture containing a mole ratio of sulfide to thiosulfate of about 3:1. The resulting mixture is passed through suitable heating means into reduction zone 26 which is maintained at a temperature of 375° F., and a pressure of 250 p.s.i.g. The contact time is about 5 minutes. An analysis of the effluent from zone 26 indicates that about 70 wt. percent of the ammonium thiosulfate is converted to ammonium polysulfide. The resulting aqueous stream containing ammonium polysulfide is withdrawn from zone 26 via line 27 and passed via line 1 back to hydrocarbon conversion zone 2. Within hydrocarbon conversion zone 2, the ammonium polysulfide contained in this aqueous stream is reduced to hydrogen sulfide with a minimum amount of hydrogen. Operations as indicated are continued for a hydrocracking catalyst life of about 20 barrels per pound of catalyst and the product stream recovered via line 12 remains substantially free of elemental sulfur and there is no significant aqueous waste stream disposal problems. Therefore, a waste water disposal pollution problem has been abated, elemental sulfur has been recovered from the waste stream, and the loop is closed with respect to recycle water.

I claim as my invention:

1. A process for converting a hydrocarbon charge stock containing sulfurous and nitrogenous contaminants and for simultaneously recovering elemental sulfur and ammonia, said process comprising the steps of:
  (a) contacting, in a hydrocarbon conversion zone, the hydrocarbon charge stock, hydrogen and an aqueous recycle stream containing ammonium polysulfide with a hydrocarbon conversion catalyst at conversion conditions sufficient to form an effluent stream containing substantially sulfur-free and nitrogen-free hydrocarbons, hydrogen, $NH_3$, $H_2S$, and $H_2O$;
  (b) cooling and separating the effluent from step (a) to form a hydrogen-rich gaseous stream, a hydrocarbon-rich liquid product stream, and an aqueous waste stream containing $NH_4HS$;
  (c) catalytically treating the aqueous waste stream from step (b) with oxygen at oxidizing conditions effective to produce an effluent stream containing $NH_4OH$, $(NH_4)_2S_2O_3$, and elemental sulfur or ammonium polysulfide;
  (d) separating sulfur and ammonia from the effluent stream from step (c) to produce an aqueous stream containing $(NH_4)_2S_2O_3$;
  (e) subjecting a mixture of the aqueous stream produced in step (d) and a sulfide-containing stream to reduction conditions effective to produce an aqueous recycle stream containing ammonium polysulfide; and
  (f) passing the aqueous recycle stream to step (a).

2. A process as defined in claim 1 wherein said hydrocarbon conversion catalyst comprises a metallic component selected from the metals and compounds of the metals of Group VI(b) or Group VIII combined with a refractory inorganic oxide carrier material.

3. A process as defined in claim 2 wherein said hydrocarbon charge stock boils above the gasoline range and said conversion conditions are hydrocracking conditions.

4. A process as defined in claim 1 wherein the reduction conditions utilized in step (e) include a temperature of about 200° F. to about 700° F., a pressure sufficient to maintain a part of the water in the liquid phase, and a contact time of about 0.01 to about 2 hours.

5. A process as defined in claim 2 wherein said hydrocarbon charge stock boils in the range of about 100° F. to about 650° F. and wherein said conversion conditions are hydrorefining conditions.

6. A process as defined in claim 1 wherein step (c) comprises contacting the aqueous waste stream and oxygen with a phthalocyanine catalyst at oxidizing conditions effective to produce an effluent stream containing $NH_4OH$, $(NH_4)_2S_2O_3$, and elemental sulfur or ammonium polysulfide.

7. A process as defined in claim 1 wherein step (c) comprises contacting the aqueous waste stream and oxygen with a catalyst comprising an iron group metallic component combined with a refractory inorganic oxide at oxidizing conditions effective to produce an effluent stream containing $NH_4OH$, $(NH_4)_2S_2O_3$, and elemental sulfur or ammonium polysulfide.

8. A process as defined in claim 1 wherein a water-immiscible sulfur solvent is also charged to step (c) and wherein step (d) comprises: separating the effluent stream from step (c) into a sulfur solvent phase containing sulfur formed in step (c) and an aqueous phase containing $NH_4OH$ and $(NH_4)_2S_2O_3$, and stripping at least a portion of the ammonia from this last aqueous phase to produce an aqueous stream containing $(NH_4)_2S_2O_3$.

9. A process as defined in claim 1 wherein step (c) is operated with less than 0.5 mole of oxygen per mole of $NH_4HS$ in the waste stream to produce an aqueous effluent stream containing ammonium polysulfide, $NH_4OH$, and $(NH_4)_2S_2O_3$, and wherein step (d) comprises: subjecting the effluent stream from step (c) to polysulfide decomposition conditions effective to produce a vapor stream containing $NH_3$, $H_2S$, and $H_2O$ and an aqueous stream containing elemental sulfur and $(NH_4)_2S_2O_3$, and separating sulfur from this last stream to form an aqueous stream containing $(NH_4)_2S_2O_3$.

10. A process as defined in claim 1 wherein said oxidizing conditions utilized in step (c) include a temperature less than about 200° F.

11. A process as defined in claim 1 wherein the sulfide-containing stream utilized in step (e) is a portion of the aqueous waste stream containing $NH_4HS$ formed in step (b).

12. A process as defined in claim 9 wherein the sulfide-containing stream utilized in step (e) is a portion of the vapor stream containing $NH_3$, $H_2S$, and $H_2O$ resulting from the decomposition of ammonium polysulfide.

13. A process as defined in claim 1 wherein the hydrocarbon-rich liquid product stream recovered from step (b) is passed to a low pressure separating zone wherein a $H_2S$-rich gas stream is flashed off and wherein the sulfide-containing stream utilized in step (e) is a portion of the resulting $H_2S$-rich gas stream.

14. A process as defined in claim 1 wherein the reduction conditions utilized in step (e) include a temperature of about 325° F. to about 400° F., a pressure of about 100 to about 5000 p.s.i.g., and a contact time of about 0.05 to about 0.2 hour.

15. A process as defined in claim 1 wherein the mole ratio of sulfide to thiosulfate utilized in step (e) is about 2:1 to about 4:1.

References Cited

UNITED STATES PATENTS 3,340,182   9/1967   Berkman et al. _____ 208—212

DELBERT E. GANTZ, Primary Examiner

A. RIMENS, Assistant Examiner

U.S. Cl. X.R.

208—212, 254